United States Patent
Ndip-Agbor et al.

(10) Patent No.: US 10,162,329 B2
(45) Date of Patent: Dec. 25, 2018

(54) AUTOMATED TOOLPATH GENERATION METHOD FOR DOUBLE SIDED INCREMENTAL FORMING

(71) Applicant: Northwestern University, Evanston, IL (US)

(72) Inventors: Ebot E. Ndip-Agbor, Evanston, IL (US); Jian Cao, Wilmette, IL (US)

(73) Assignee: Northwestern University, Evanston, IL (US)

( * ) Notice: Subject to any disclaimer, the term of this patent is extended or adjusted under 35 U.S.C. 154(b) by 148 days.

(21) Appl. No.: 15/424,182

(22) Filed: Feb. 3, 2017

(65) Prior Publication Data

US 2017/0227947 A1 Aug. 10, 2017

Related U.S. Application Data

(60) Provisional application No. 62/291,633, filed on Feb. 5, 2016.

(51) Int. Cl.
*G05B 19/02* (2006.01)
*G05B 19/29* (2006.01)

(52) U.S. Cl.
CPC .... *G05B 19/29* (2013.01); *G05B 2219/35167* (2013.01)

(58) Field of Classification Search
None
See application file for complete search history.

(56) References Cited

U.S. PATENT DOCUMENTS

| | | | |
|---|---|---|---|
| 8,733,143 B2 | 5/2014 | Kiridena et al. | |
| 8,783,078 B2 | 7/2014 | Ren et al. | |
| 9,168,580 B2 | 10/2015 | Cao et al. | |
| 9,221,091 B2 | 12/2015 | Beltran et al. | |
| 2010/0199742 A1 | 8/2010 | Johnson et al. | |
| 2013/0103177 A1* | 4/2013 | Cao | B21D 31/005 700/98 |
| 2013/0325165 A1* | 12/2013 | Song | G05B 19/4097 700/186 |
| 2014/0150510 A1* | 6/2014 | Beltran | B21D 31/005 72/19.1 |

OTHER PUBLICATIONS

Jie, Liu et al., Sheet metal dieless forming and its tool path generation based on STL files, the International Journal of Advanced Manufacturing Technology 23. 9-10, pp. 696-699, (2004).
Malhotra, R. et al., Automatic 3D Spiral Toolpath Generation for Single Point Incremental Forming, Journal of Manufacturing Science and Engineering, vol. 132, ASME, pp. 061003-1 thru 061003-10, (2010).

(Continued)

*Primary Examiner* — Paul B Yanchus, III
(74) *Attorney, Agent, or Firm* — Cook Alex Ltd.

(57) ABSTRACT

An automated method for generating toolpaths in double sided incremental forming (DSIF) operations is disclosed which uses a geometrically constructed map to build a structure of all the geometric features that is capable of tracking and forming the features in the correct order while simultaneously keeping track of the location of the virgin material. The aforementioned method allows toolpaths for complex geometries in the DSIF process to be generated automatically.

12 Claims, 26 Drawing Sheets

(56) References Cited

OTHER PUBLICATIONS

Malhotra, R. et al., Improvement of Geometric Accuracy in Incremental Forming by Using a Squeezing Toolpath Strategy With Two Forming Tools, Journal of Manufacturing Science and Engineering, vol. 133, ASME, pp. 061019-1 thru 061019-10 (2011).

Malhotra, R. et al., Accumulative-DSIF strategy for enhancing process capabilies in incremental forming, CIRP Annals—Manufacturing Technology, pp. 251-254, (2012).

Lu, B. et al., Feature-based tool path generation approach for incremental sheet forming process, Journal of Materials Processing Technology, vol. 213(7), pp. 1221-1233 (2013).

Ndip-Agbor, E. et al., Automatic feature-driven toolpath generation in double sided incremental forming using rooted trees, Computer-Aided Design, pp. 1-22, (Feb. 2, 2016).

Ndip-Agbor, E. et al., Automatic feature-driven toolpath generation in rapid dieless sheet forming using rooted trees, Computer-Aided Design, pp. 1-24, (Apr. 10, 2016).

\* cited by examiner

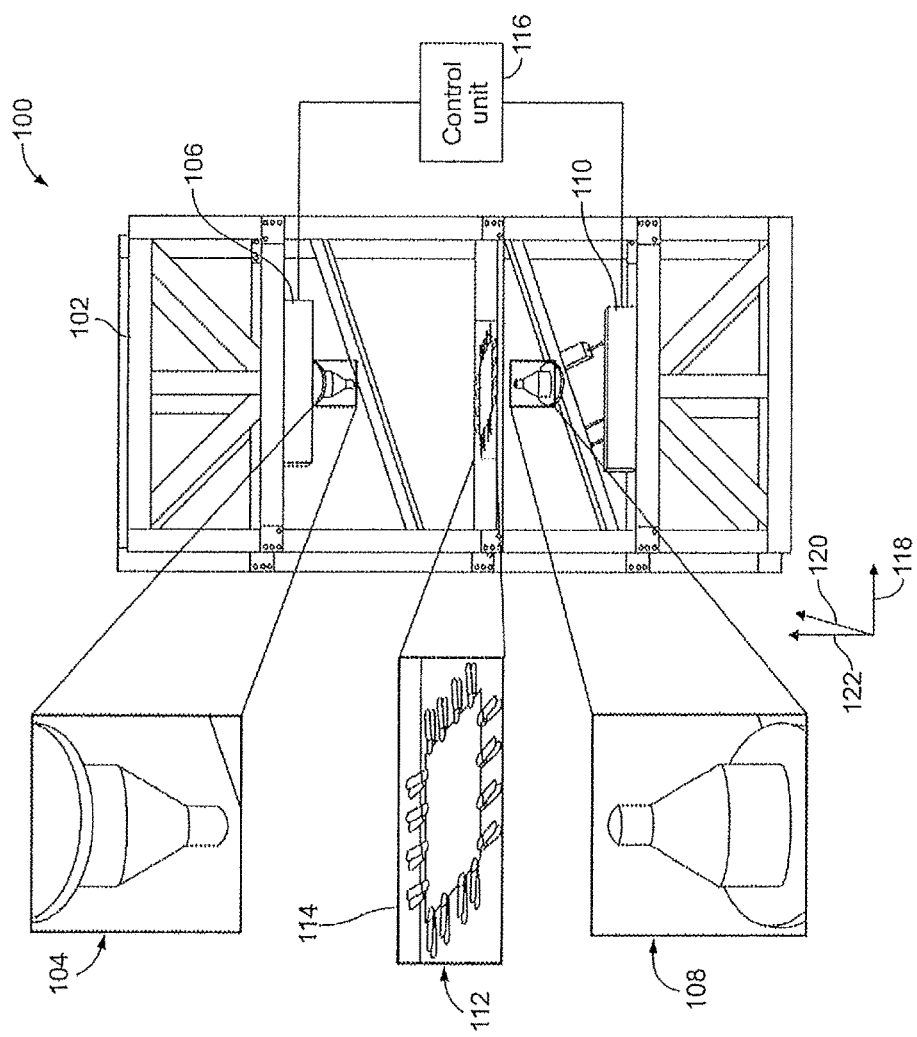

| Keys | Values |
|---|---|
| Texas | Houston |
| Texas | Dallas |
| Florida | Miami |
| Illinois | Evanston |
| Illinois | Chicago |

| Keys | Values |
|---|---|
| Curve 1 | Curve 2 |
| Curve 2 | Curve 3 |
| Curve 3 | Curve 4 |

FIG. 9b

| Curve | Enclosed Curves |
|-------|-----------------|
| C1    | C2, C3, C4      |
| C2    | C3, C4          |
| C3    | C4              |

FIG. 9c

| Curve | Enclosed Curves |
|-------|-----------------|
| P1    | P2, P3, P4      |
| P2    | P3, P4          |
| P3    | P4              |

FIG. 9d

| Curve | Enclosed Curves |
|-------|-----------------|
| C1    | P1, P2, P3, P4  |
| C2    | P3, P4          |
| C3    | P4              |

FIG. 9e

| Curve | Enclosed Curves |
|-------|-----------------|
| P1    | C2, C3, C4      |
| P2    | C2, C3, C4      |
| P3    | C4              |
| P4    | C4              |

| Forming Order | Forming Direction |
|---|---|
| 1 | Downward |
| 6 | Upward |
| 2 | Upward |
| 3 | Upward |
| 7 | Upward |
| 4 | Upward |
| 5 | Upward |
| 9 | Downward |
| 8 | Downward |
| 10 | Downward |

FIG. 17b

| Forming Order | Forming Direction |
|---|---|
| 2 | Upward |
| 3 | Upward |
| 6 | Upward |
| 4 | Upward |
| 5 | Upward |
| 7 | Upward |
| 8 | Downward |
| 9 | Downward |
| 10 | Downward |
| 1 | Downward |

FIG. 17c

AUTOMATED TOOLPATH GENERATION METHOD FOR DOUBLE SIDED INCREMENTAL FORMING

CONTRACTUAL ORIGIN OF THE INVENTION

This invention was made with government support under DE-EE0005764 awarded by the U.S. Department of Energy. The government has certain rights in the invention.

BACKGROUND

Toolpath generation for a deformation based flexible manufacturing processes like incremental forming is very challenging because the sheet stock material moves as the toolpath progresses. CNC machining toolpaths work fairly well for single point incremental forming (FIG. 1a) because the features always lie below the blank/workpiece, but these toolpaths are inadequate for double sided incremental forming ("DSIF") (FIG. 1b). DSIF uses two tools, one on either side of the blank, which makes it possible to form concave and convex features by switching which tool acts as the forming tool or the supporting tool.

In general, CNC toolpaths are not appropriate for DSIF is because embedded features have to be formed in the correct sequence to make sure the tools do not puncture the sheet stock workpiece. Existing CNC machining based tool can only generate toolpaths in one direction. In order to use the existing CNC machining module for making features on both sides of the sheet, one has to generate machining paths from two different directions, and manually sort out the forming sequence and stitch those toolpaths together.

Further, in existing technologies, the toolpath is generated from CAM software, and the following steps are performed manually by the operator of the tools: separating the toolpath contour by contour, grouping the contours into features, picking the feature forming order, reversing the toolpath for concave features, and synchronizing the tools to go from feature to feature.

The method described herein uses geometrically constructed maps to create a hierarchical structure in the form of a rooted tree to group features, which makes it possible to form features on either side of the sheet. This method sorts all the features and automatically provides a synchronized path for the supporting tool to follow the forming tool to form all the features on the part in the correct order and direction. The method permits fine control of the individual features and their process parameters, arbitrary changes to the forming order and direction of the features within the feasibility of a forming operation, and translation of each individual feature to the plane to enhance the geometric accuracy of the process.

In this method, the features in a particular geometry or object are represented as a hierarchical data structure. The hierarchical data structure of choice is a rooted tree, since it allows fine control over individual features which are represented as nodes in the tree. Tree traversal algorithms can then be used to generate toolpaths for the individual features, which allow the forming order and direction of the features to be changed accordingly.

A map is used to hold information about the relationship between features during the slicing stage of toolpath generation, because maps provide logarithmic complexity for key insertions and lookups.

The maps are then be used to build the rooted trees once all the information about the relationships between the features has been stored.

This approach is unique in its use of fundamental data structures to develop a new way of representing features in DSIF and similar processes which gives users incredible versatility and control over the toolpath generation process for complex geometries.

SUMMARY OF THE INVENTION

In a first aspect of the invention, a method is provided for automatically generating a toolpath for double-sided incremental forming of a workpiece into an object having a geometry. The method comprises first recognizing features of the geometry by i) intersecting a model of the geometry to generate a series of closed intersection curves in each of a plurality of slices; ii) ordering the intersection curves for each slice from an outermost curve for each slice; and iii) mapping the intersection curves in each slice to generate a local map. Then, the local map for adjacent slices are combined to generate a projection map. The projection map is then combined to generate a global map representative of all the features in the geometry. A rooted tree is then generated from the feature relationship map, and a toolpath generated for a double-sided incremental forming tool by traversing the rooted tree in a first order.

In a second aspect, a method for making an object having a geometry by double-sided incremental forming by automatically generating a toolpath, as set forth above; engaging opposite sides of a workpiece with first and second tools; and automatically moving the tools along the toolpath.

In a third aspect, a system for double-sided incremental forming is provided comprising a frame configured to hold a workpiece. First and second tool positioning assemblies are coupled with the frame, the first and second tool positioning assemblies configured to be opposed to each other on opposite sides of the workpiece, with the first tool positioning assembly including a first tool holder configured to secure a first tool and the second tool positioning assembly including a second tool holder configured to secure a second tool, with each of the first and second tool positioning assemblies comprising a tool holder frame movably coupled to a support structure of the tool positioning assembly. The system further includes a controller for moving the tool positioning assemblies along a toolpath, wherein the toolpath is automatically generated in accordance with the method described above.

BRIEF DESCRIPTION OF THE DRAWINGS

FIG. 2 is a plan view of an illustrative embodiment of a DSIF system that may advantageously utilize the methods described herein.

FIG. 3: is a map in the form of a table showing keys and values.

FIG. 4a illustrates the intersection of curves at a single slicing depth.

FIG. 4b is a curve map derived from FIG. 4a.

FIGS. 9b and 9c illustrate local maps for the Slicing Planes 1 and 2 respectively shown in FIG. 9a.

FIGS. 9d and 9e illustrate projection maps for Slicing Planes 1 and 2 respectively as shown in FIG. 9a.

FIGS. 17a, 17b, and 17c illustrate a hierarchical structure of all features (17a), a forming order and direction (17b) for forming the geometry of FIG. 16c, and an alternate forming order and direction (17c) for forming the geometry of FIG. 16c.

FIGS. 18a and 18b are photographs of top and bottom views respectively of an object formed in accordance with the strategy of FIG. 17b above, while

DETAILED DESCRIPTION

Figure 1A:
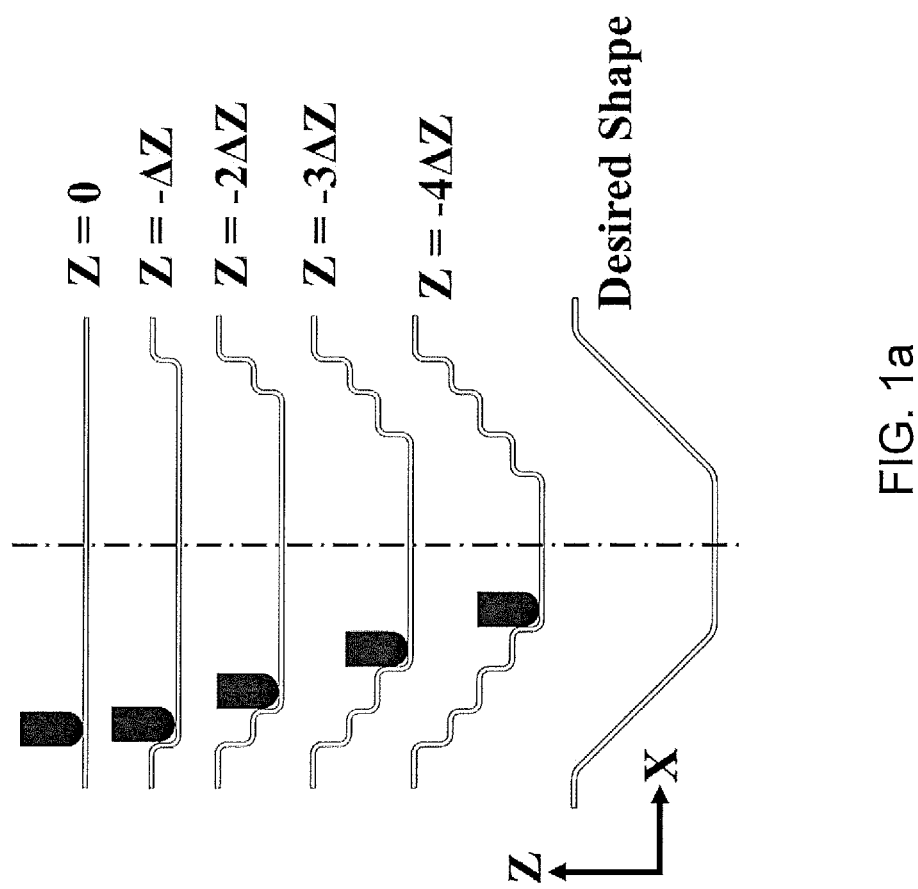
FIG. 1a schematically represents a Single Point Incremental Forming tool.
Figure 1B:
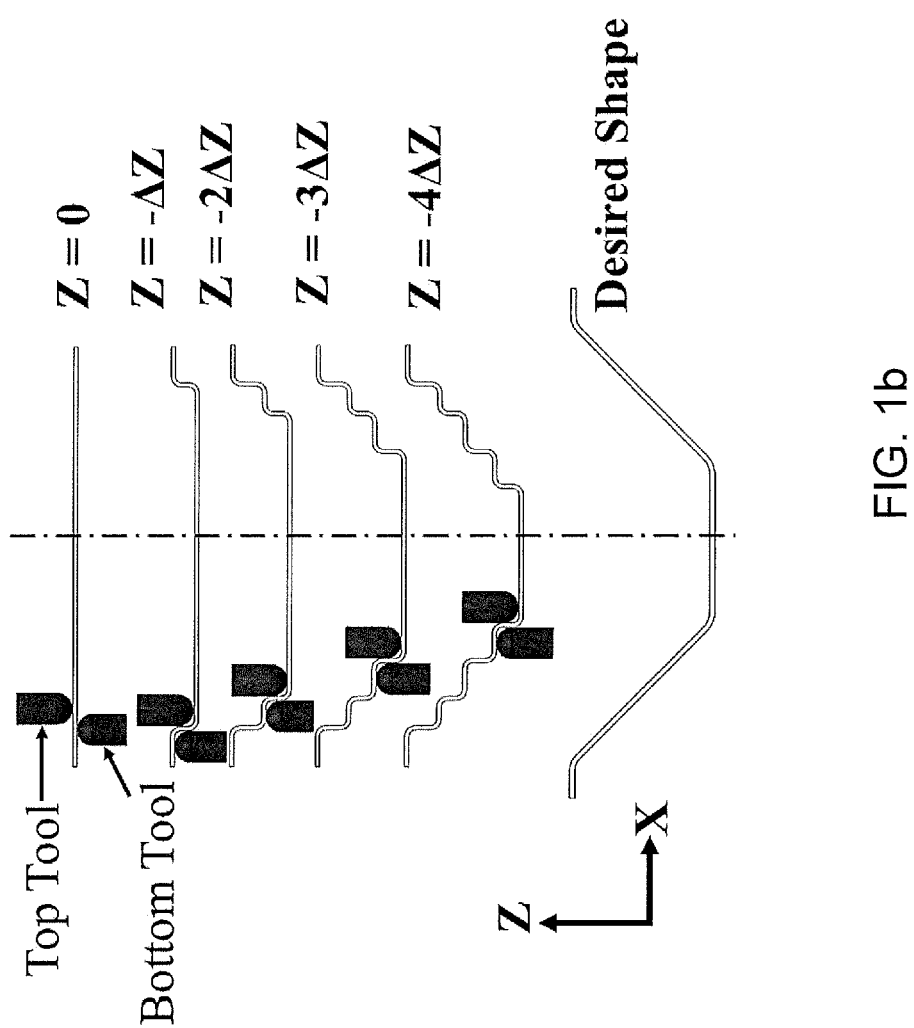
FIG. 1b schematically represents Double Sided Incremental Forming tool.

A more detailed description of the systems and methods in accordance with the present disclosure is set forth below. It should be understood that the description below of specific devices and methods is intended to be exemplary, and not exhaustive of all possible variations or applications. Thus, the scope of the disclosure is not intended to be limiting, and should be understood to encompass variations or embodiments that would occur to persons of ordinary skill.

The methods described herein may be advantageously used in double-sided incremental forming systems, such as those shown and described in U.S. Pat. No. 9,168,580 and U.S. Pat. No. 9,221,091, both of which are incorporated herein in their entirety.

With reference to FIG. 2, such a system 100 includes a frame 102 that supports the various components of the system. A top or upper tool 104 may be coupled with the frame by one or more moving assemblies 106 that can move the top tool along the one or more orthogonal X, Y, and/or Z directions 118, 120, 122. A bottom or lower tool 108 may be coupled to the frame 102 by one or more moving assemblies 110 to move the lower tool along one or more of the X, Y, and/or Z directions 118, 120, 122. A clamping assembly 112 holds the sheet that is to be formed into a component by the system. The clamping system 112 may include one or more clamps 114 that secure the sheet so that the sheet remains stationary while the tools move relative to the sheet. A control unit 116 includes one or more processing units that may be preprogrammed to control the movements of the tools relative to the sheet along a prescribed toolpath created in accordance with the methods described below.

The two main data structures used in the method described herein are maps and rooted trees. A map is a collection or a table of 'key' and 'value' pairs (FIG. 3) where each key provides a flexible way to lookup values in the tabular structure. The map implementation used allows a key to be mapped to multiple values, which is suitable for toolpath generation because geometries can contain features which enclose two or more other features immediately inside them. A map provides a flexible way to store information about the relationship between curves in a Z-level intersection during the slicing stage of toolpath generation.

Figures 3, 4A, 4B:
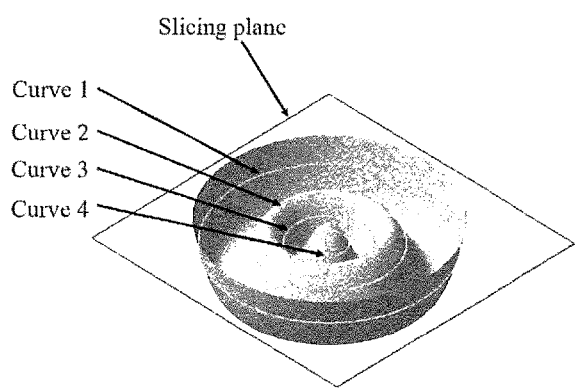

With reference to FIG. 4a, each curve in an intersection can be given an index and used as a key or value in a map. In the resulting table (FIG. 4b), each curve index represents a key, and its corresponding values are the indices of the curves it immediately encloses. Not all the curves on a specific plane are represented in the local map, only those curves either enclosing other curves (key), or those immediately being enclosed (value) are represented. The map represented in FIG. 4b is referred to as a "local map" because it represents the relationship between curves on a particular slice or plane. The complete set of all the maps for all the slices in the geometry can be reduced into a single "global map," which is used as a representation of all the features present in the geometry.

Figure 5:
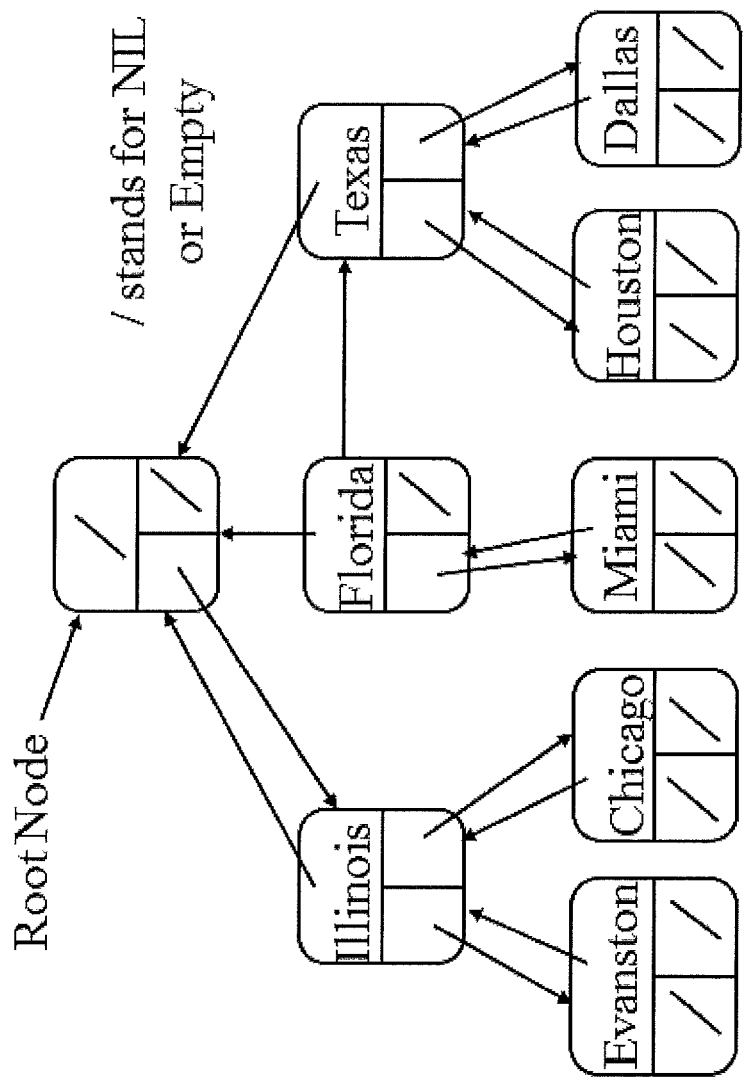
FIG. 5 represents a rooted tree data structure showing parent, left child, and right sibling for each node.
Figure 6:
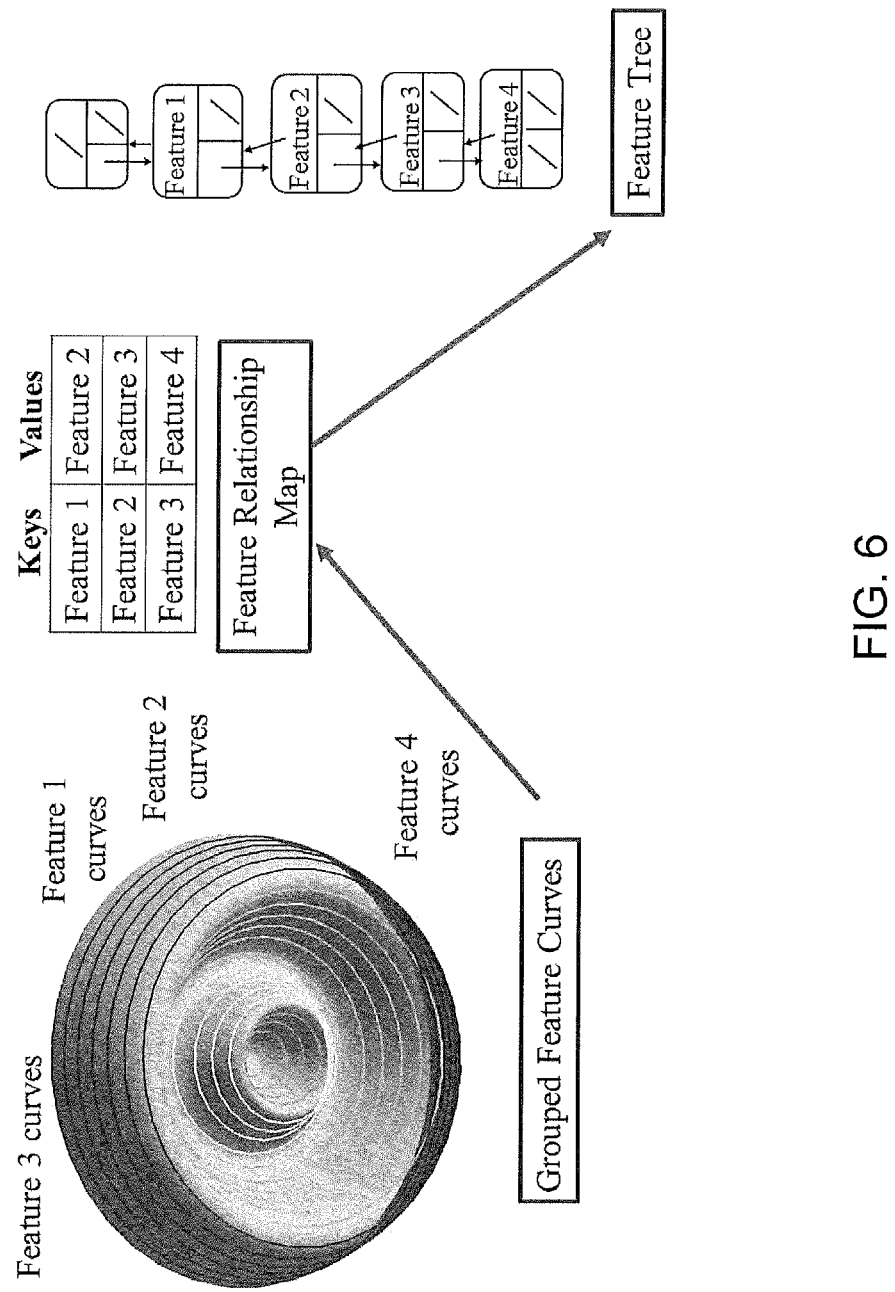
FIG. 6 shows the relationship between a plurality of grouped feature curves, a global feature map, and a feature tree.

A rooted tree is an extension of the scheme used to represent binary trees, where each node contains a pointer to a parent, a left child, and a right sibling as shown in FIG. 5. In the present method, representing all the features in a geometry as a rooted tree is advantageous because it provides an easy and arbitrary way to manipulate features via tree traversal algorithms. The rooted tree is built directly from the aforementioned global map, so it also encodes the relationship information between all the features in the geometry as shown in FIG. 6.

A full description of the automatic method for double-sided incremental sheet forming of the freeform shape will be presented in the following sections:
 1. Building relationship maps between intersection curves during Z-height slicing;
 2. Grouping intersection curves on consecutive slices into features; and
 3. Building final feature structure and generating toolpath.

1. Building Relationship Maps Between Intersection Curves During Z-Height Slicing Recognition of the features of the features in the freeform geometry is accomplished by successively slicing the shape with series of planes parallel to the X-Y axis to obtain intersections. Each intersection produces a series of closed curves. The closed curves of each intersection are ordered starting from the outermost curve to the curve(s) it immediately encloses, then to each of the curves immediately enclosed by each of the closed curves, and so on until all the curves have been processed as shown in FIG. 4a. FIG. 4b shows how a local map can be used to conveniently encode this information for each intersection.

Figure 7A:
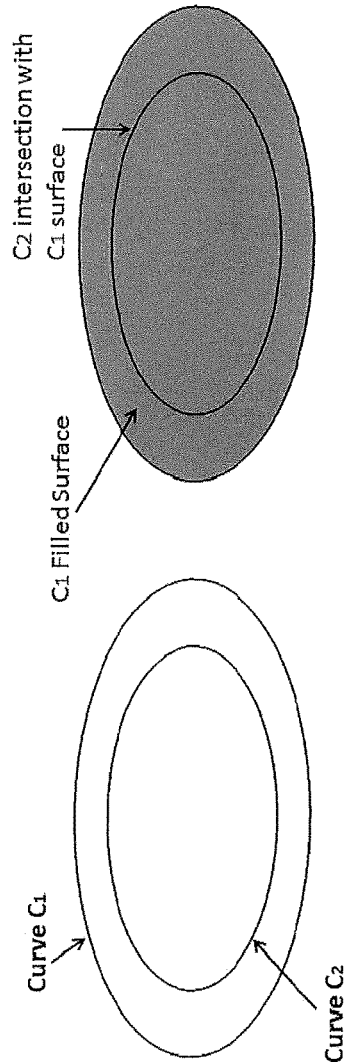
FIG. 7a illustrates an intersecting curve and filled surface on the same slice.

This ordering is done for each slice by successively selecting each intersection curve, filling it to obtain a surface, and intersecting this surface with each of the remaining intersection curves. If any of the remaining curves are enclosed by the selected curve, then there will be an intersection between the filled surface and the curves, as shown in FIG. 7a.

Figure 7B:
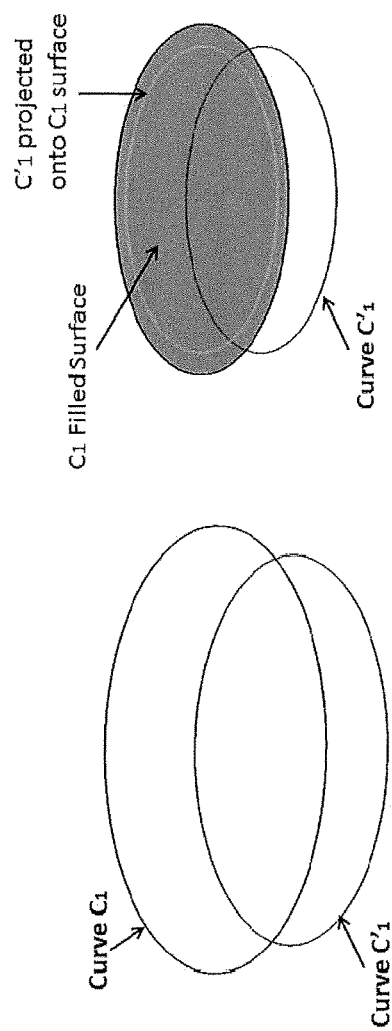
FIG. 7b illustrates a projecting curve to a filled surface on an adjacent slice.

Intersections on successive slices have to be paired together correctly to form features and features embedded inside other features have to also be recognized in order to determine the correct forming direction at the end. Therefore, a relationship has to be established between curves on adjacent or consecutive slices akin to the one formed for the curves on the same slice described above. This is done again by successively filling each intersection curve on one slice and projecting the curves on the adjacent surface to the filled surface which is done by translating the curves to the adjacent slicing plane and performing an intersection with the filled surface, as shown in FIG. 7b. Two slices are processed at a time, and this process is performed for all the intersection curves on both slices. An intersection between the filled surface and the projected curve mans the projected curve from the adjacent slice is enclosed by the filled curve.

The in-plane and out-of-plane relations between the intersection curves on the same slice and the intersection curves on two adjacent slices respectively can be easily represented by the map data structure. This representation also makes it easy to compare the intersection curves on different slices to determine not only if the number of intersection curves have changed, but also if the order of the intersection curves is different (which is discussed in further detail below).

Thus, a structure is created to store the intersections in decreasing order for each slice (i.e., a local map) and the relations between intersections on adjacent slices (i.e., a projection map). Each intersection curve on a given slice is made a surface and is intersected with all the other intersection curves on the same slice, as shown in FIG. 7a, to determine if any of the other curves are inside it. Then, the curves on the adjacent slice are projected to this surface, as shown in FIG. 7b, to determine what curves on the adjacent slice can be projected inside of it.

Figure 8:
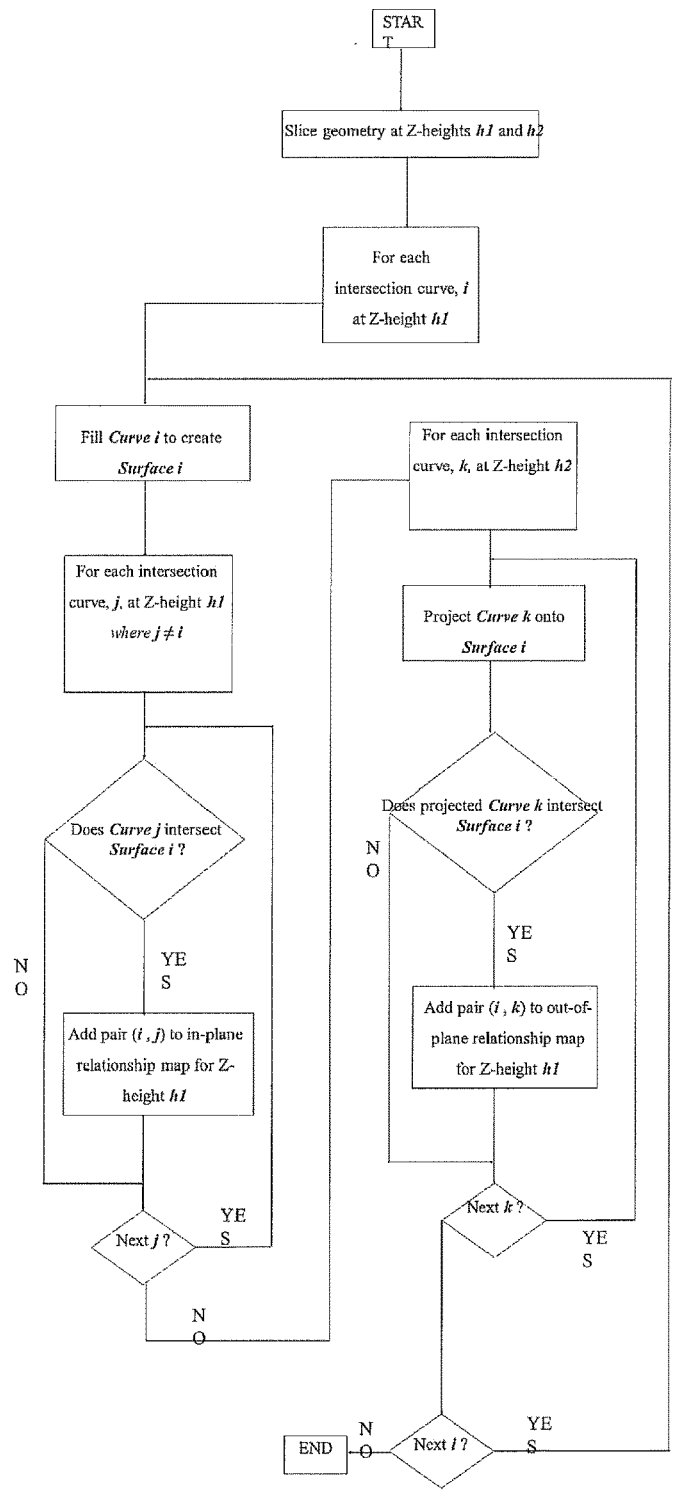
FIG. 8 illustrates an algorithm for creating local maps and projection maps for a pair of slicing planes
Figure 9A:
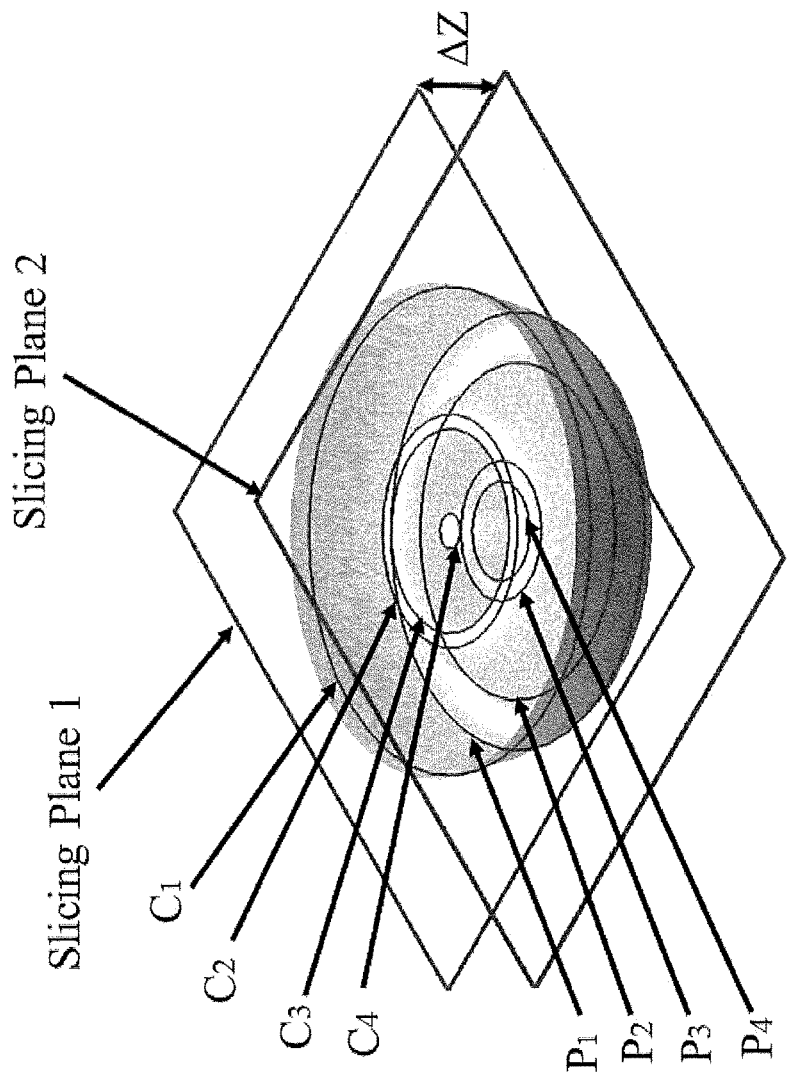
FIG. 9a illustrates an arbitrary geometry showing intersection curves at two adjacent slicing planes.

Given two adjacent slices, FIG. 8 shows the algorithm used to construct the in-plane local map and the projection map for each slicing plane in turn. This algorithm can be applied to two consecutive slices an incremental depth apart as shown in FIG. 9a to produce the local maps for the top slice, as shown in FIG. 9b and FIG. 9c, and the projection maps, as shown in FIG. 9d and FIG. 9e, for the top and bottom slicing planes respectively.

2. Grouping Intersection Curves on Consecutive Slices into Features

Given the local maps for each slice and the projection maps between all the adjacent slices, the feature relationship map can be constructed to group together all the intersection curves that belong to a feature. This feature relationship map will contain the relationship information between the features as a result (FIG. 6).

Figure 10:
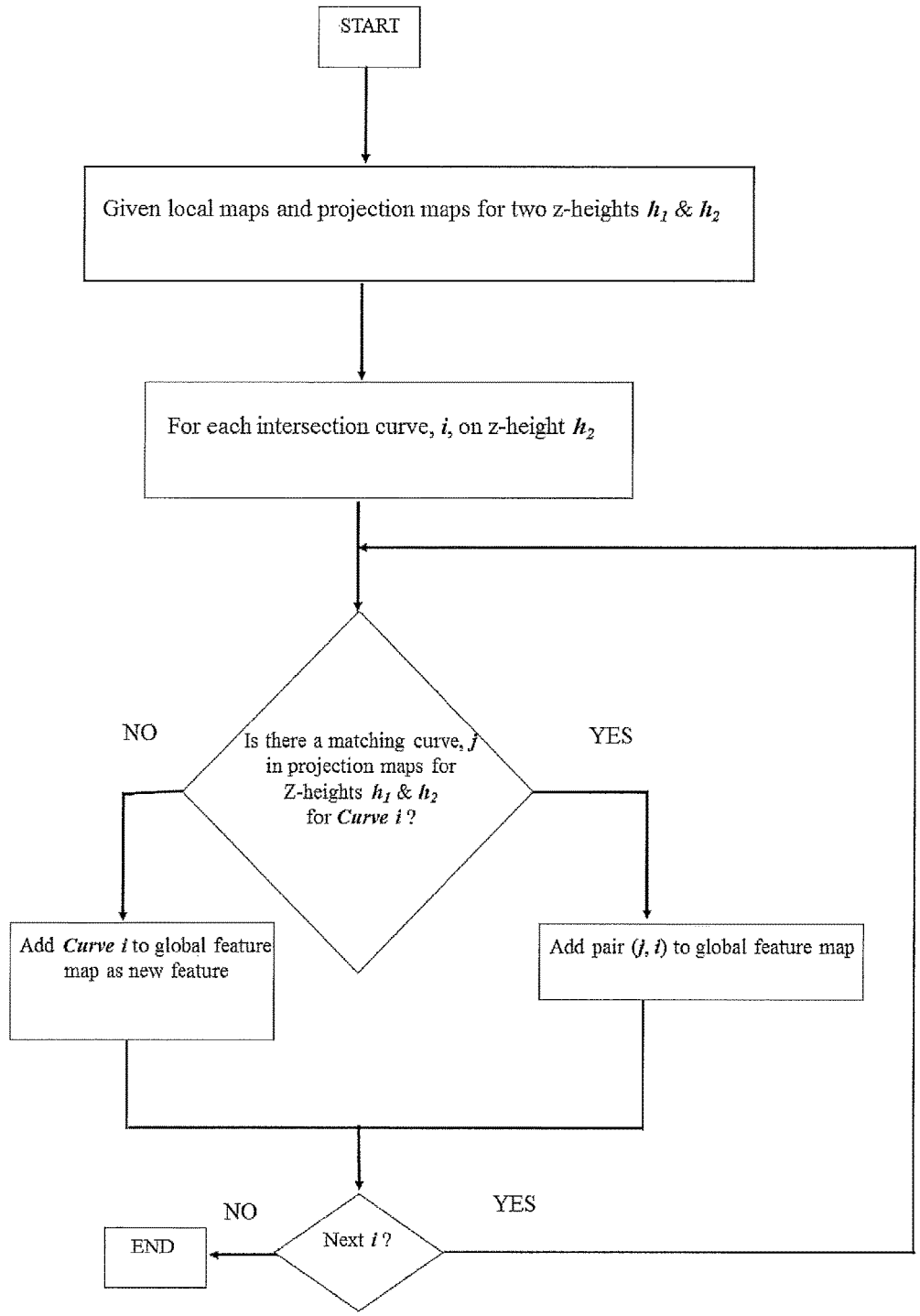
FIG. 10 illustrates an algorithm for grouping intersection curves on adjacent slices into features.

The projection maps constructed in FIG. 8 for the two slicing planes can be used to group all the intersection curves in a geometry into features by evaluating successive pairs of slicing planes. This produces a relationship map between all the z-height features present in the geometry using the algorithm shown in FIG. 10. This is performed by iterating through the intersection curves on every new slice, one at a time, and looking up each curve in the appropriate projection map (FIGS. 9d and e). If the curve index matches with another curve in one of the projection maps, then the curve being processed is a continuation of the matched curve, else the current curve is the first curve of a new feature which is added to the feature relationship map.

3. Building the Final Feature Structure and Generating a Toolpath

As described above, the geometry is continuously sliced with a series of parallel planes, and a relationship is established between the resulting intersection curves in the form of a map called the projection map. This projection map is used to connect intersection curves belonging to the same feature and to recognize the first intersection curve of a new feature during the slicing process.

The feature relationship map, on the other hand, contains each feature encountered during slicing and its relationship to the other features. Once the feature relationship map is obtained, a rooted tree can be constructed which represents the order of all the features in the freeform shape.

Figure 11:
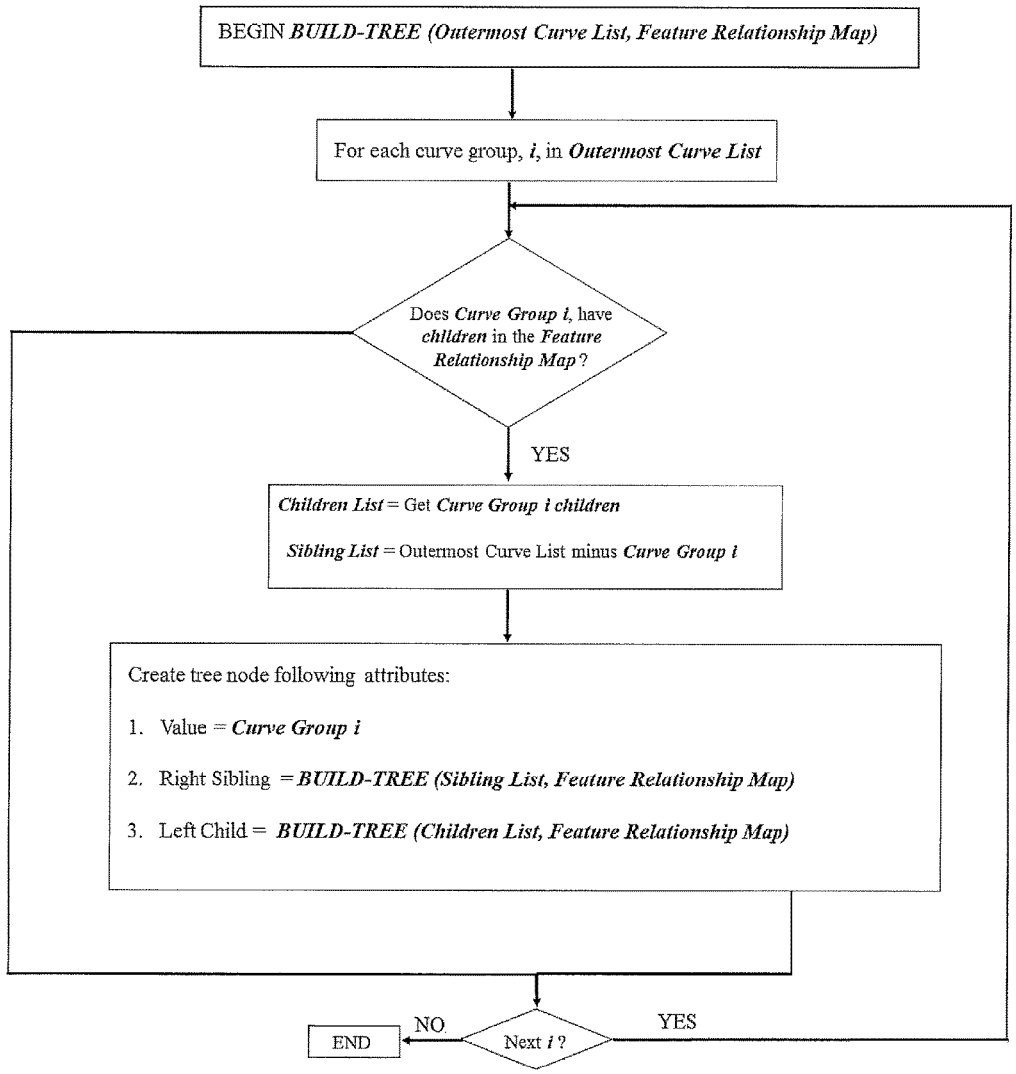
FIG. 11 illustrates the algorithm for building the feature tree from the feature relationship map.

FIG. 11 shows the algorithm used to construct the feature tree by going through the feature relationship map starting from the outermost feature and recursively building the nodes of the tree.

The children of every feature are ordered in ascending order of their distance from the surface of the blank sheet. Given this global tree and a list of all the intersection curves (in the form of discretized points) associated with each feature, the toolpath generation can be done using the algorithm shown in FIG. 12. The curvature of a feature is defined as concave if the curves that make up the feature are successively enclosed by one another in the slicing direction, or convex if the curves are successively enclosed opposite to the slicing direction. This algorithm produces a toolpath that forms the features in the correct order and direction because the hierarchical structure of the rooted tree ensures that the virgin (undeformed) material is at the depth of the current feature being formed before proceeding to form its enclosed features.

Figure 13:
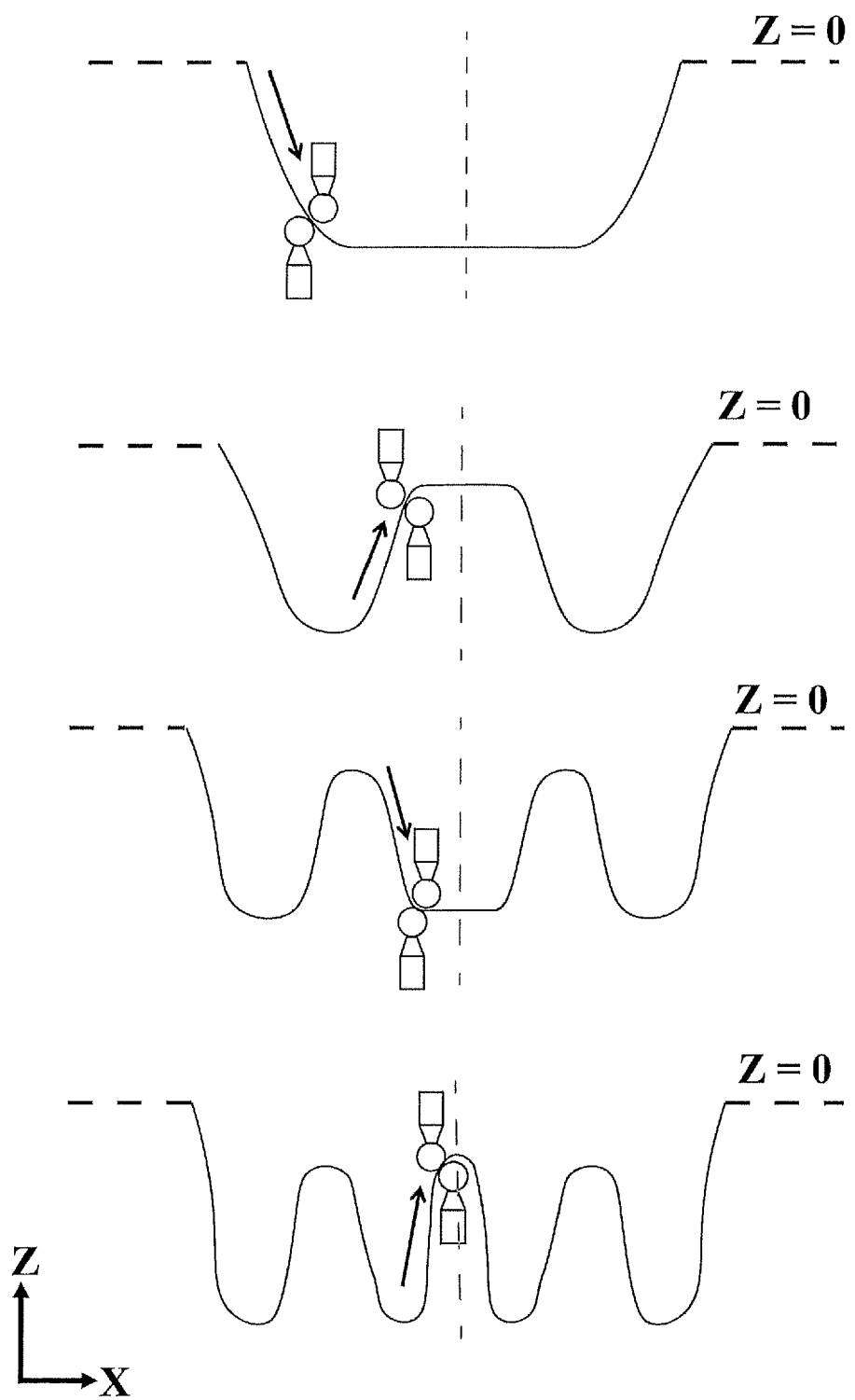
FIG. 13 illustrates the algorithm presented in FIG. 12 for the geometry in FIG. 6.

The forming sequence produced by the algorithm is illustrated, for the geometry from FIG. 6, in FIG. 13.

The method of toolpath generation described above has great flexibility in that the order in which the features are formed can be changed by simply traversing the rooted tree in a different order. Maintaining contact between the tools and the sheet is challenging in DSIF because the process mechanics and machine capabilities (particularly tool compliance) are not well understood. Loss of contact between the tools and the sheet during forming makes it difficult to form the features accurately because the position of the virgin material in the toolpath is different from its actual position.

This problem can be solved by first forming the features that do not enclose any other features on the virgin material, and the rigid body translation allows the inner features to move with the sheet to their correct positions while the outer features are being formed. A toolpath for such a forming strategy can be generated using the algorithm shown in FIG. 14.

Figure 14:
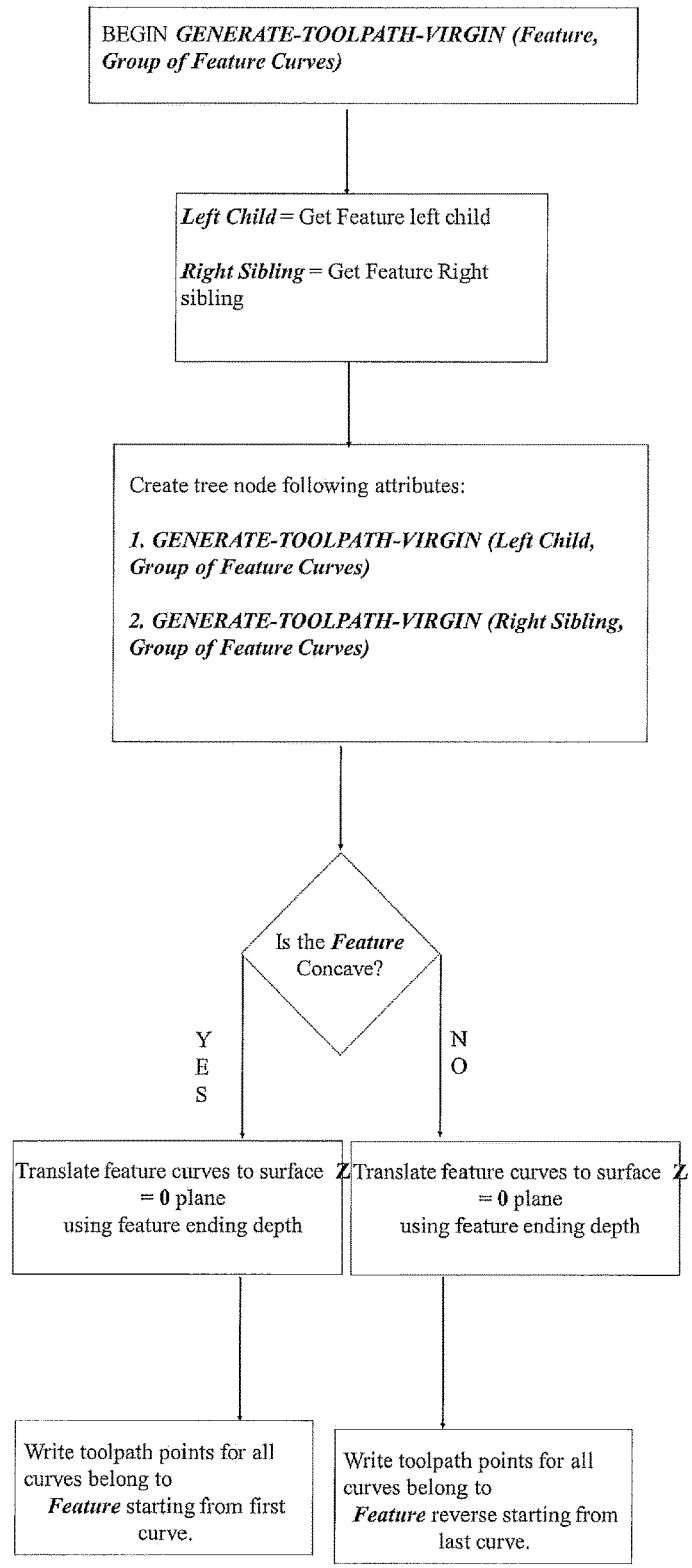
FIG. 14 illustrates an algorithm for generation of the toolpath starting from child features and ending with the parent features.
Figure 15:
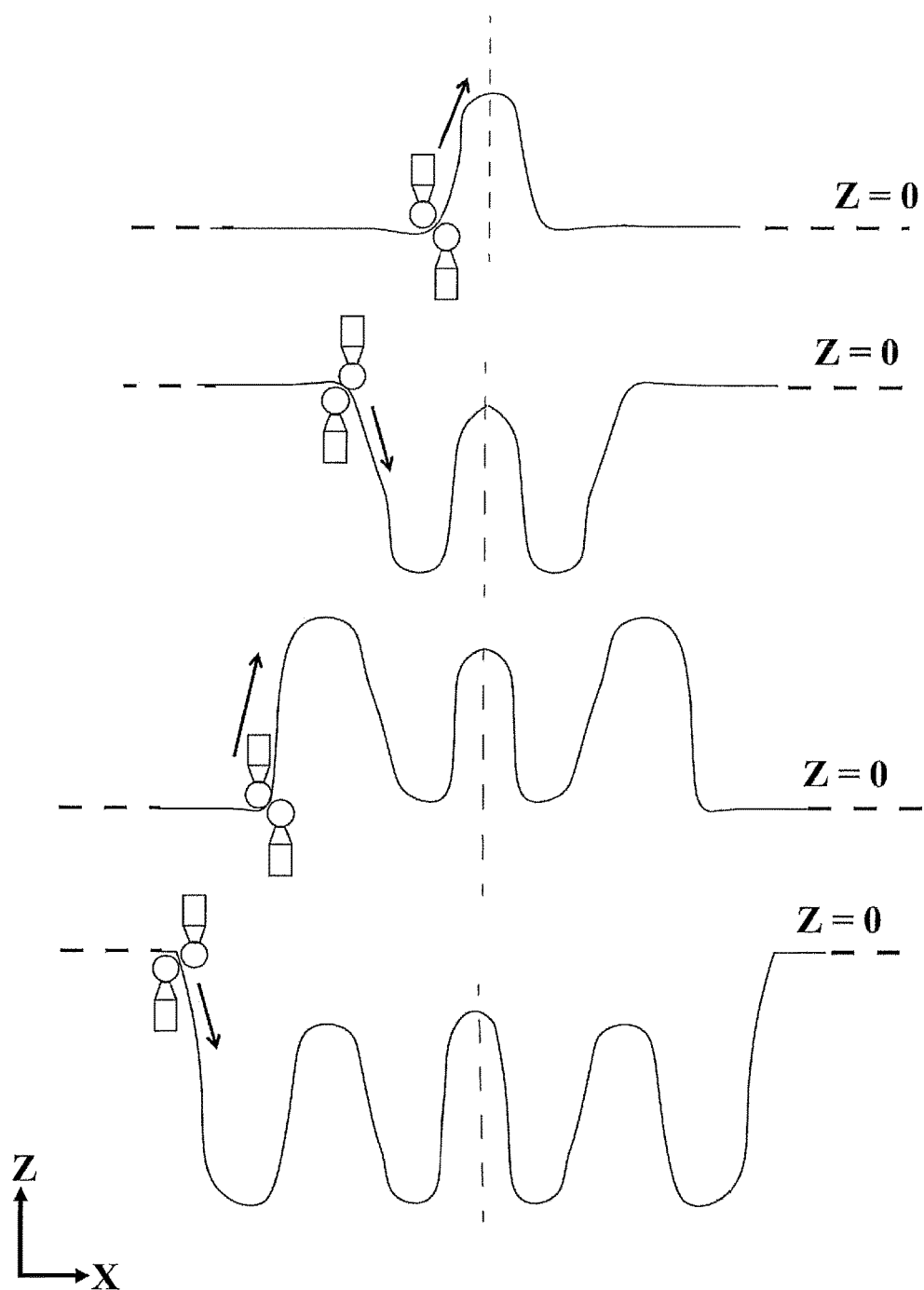
FIG. 15 illustrates the algorithm presented in FIG. 12 for the geometry in FIG. 6.

The start of a feature is considered to be the slicing depth at which the first intersection curve of the feature is detected, and the end of a feature is the slicing depth at which an intersection curve belonging to the feature cannot be matched with an intersection curve on the adjacent slice. Therefore, a feature can be translated to the virgin material by simply subtracting its starting depth (convex) or its ending depth (concave) from all the discretized toolpath points derived from the intersection curves that make up the feature. This is done while recursively traversing the feature tree to ensure that the features are always formed in the correct sequence (from enclosed to enclosing features) as shown in FIG. 14. An illustration of this algorithm is shown in FIG. 15.

Experiment

Figure 16A:
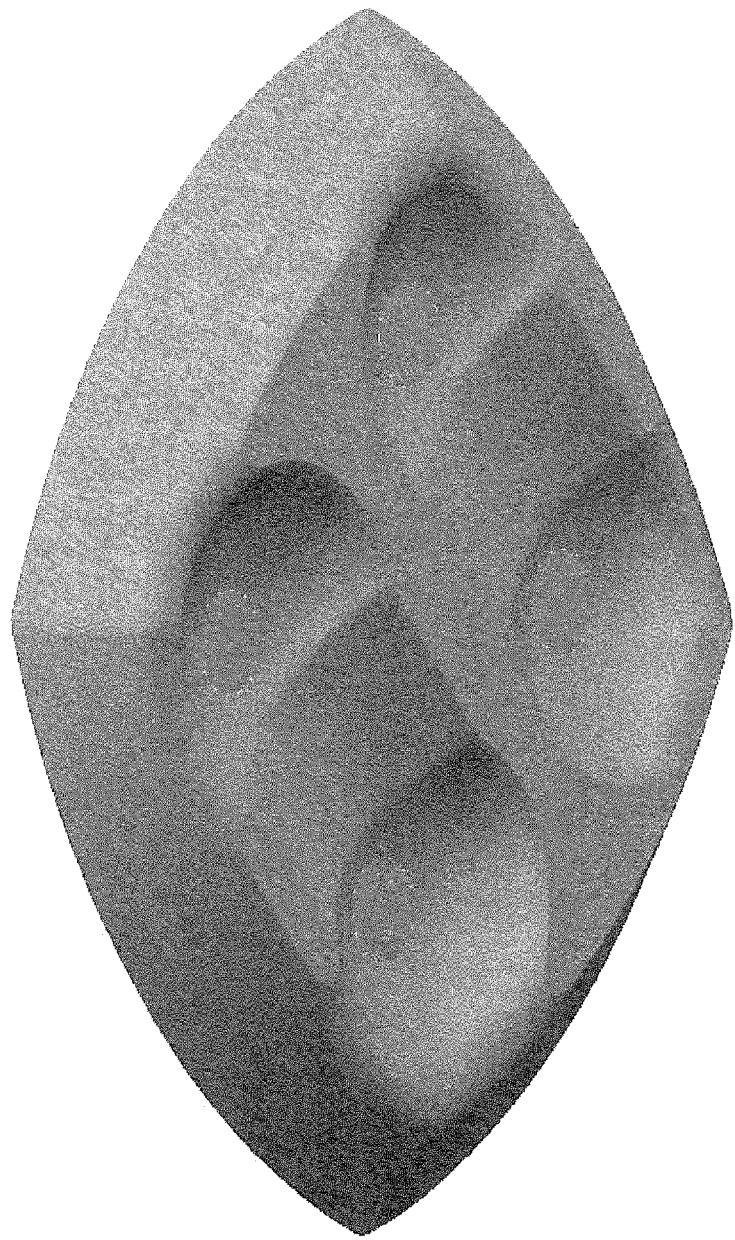
FIGS. 16a, 16b and 16c are perspective views illustrating an arbitrary complex geometry, with FIG. 16a being a top perspective view, FIG. 16b being a bottom perspective view, and FIG. 16c being an exploded view indicating the various features in the geometry.
Figure 16B:
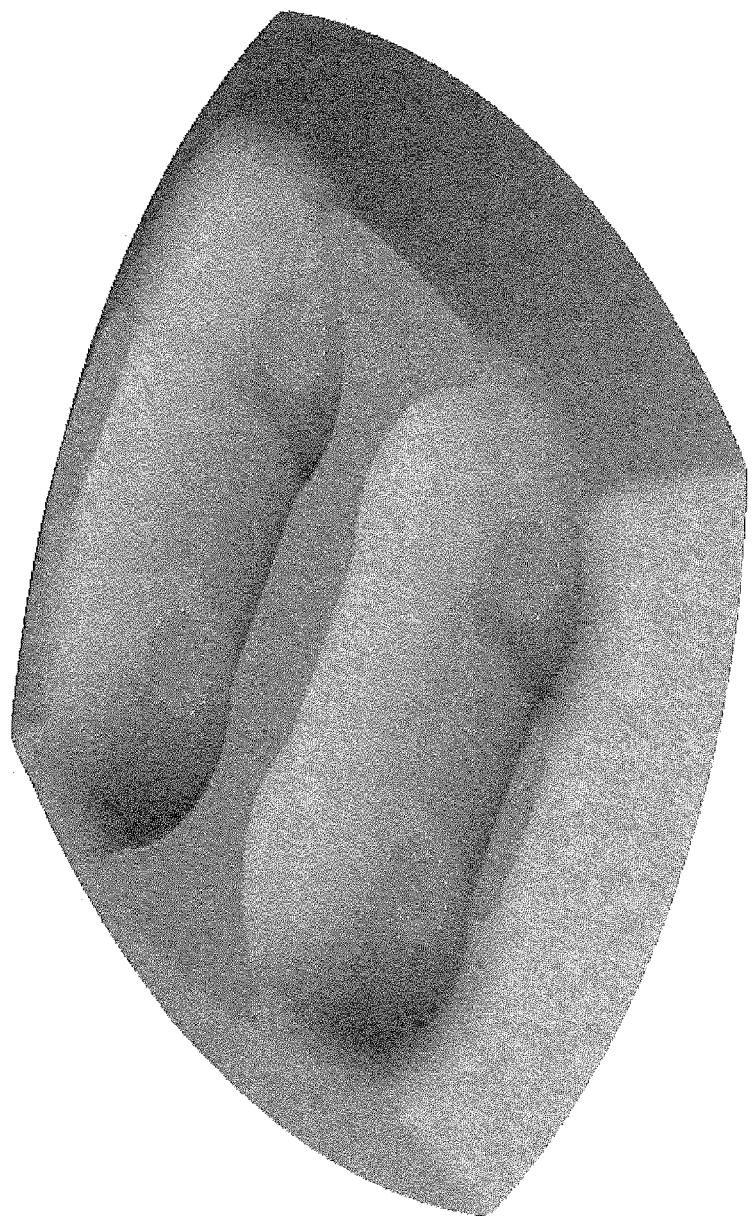
Figure 16C:
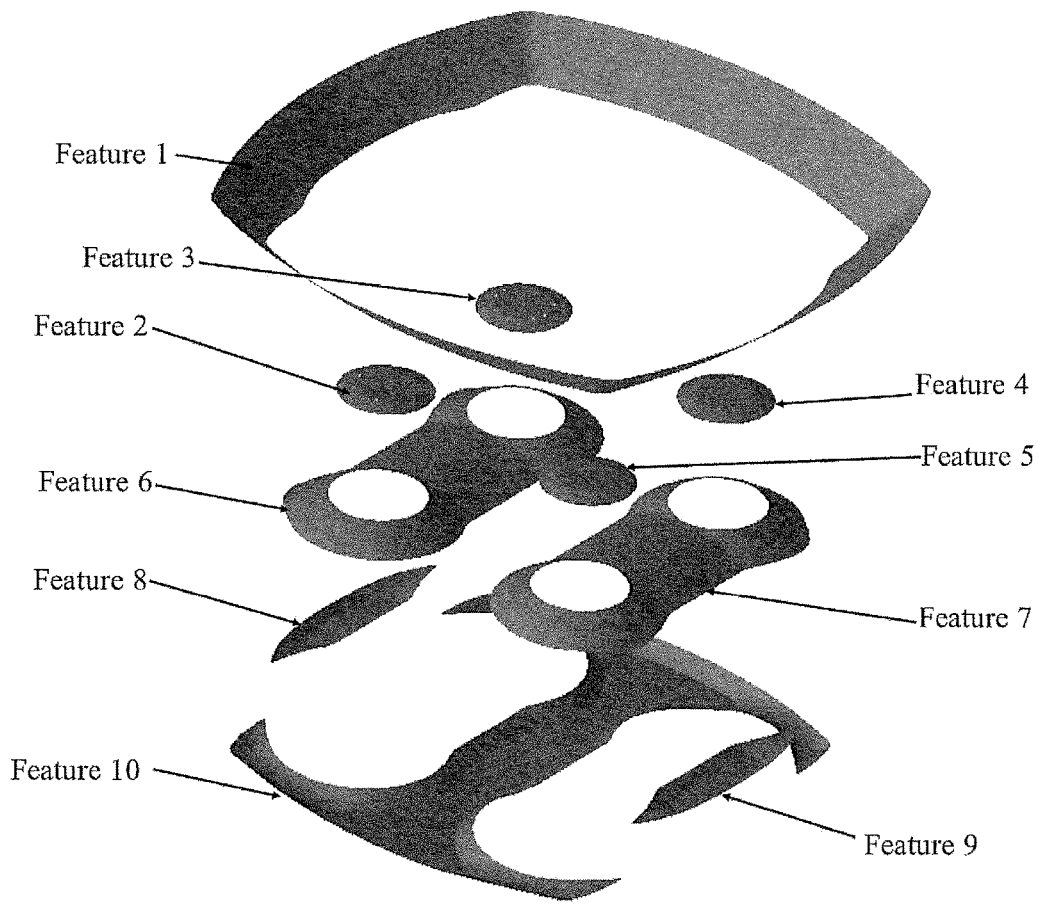
Figure 17A:
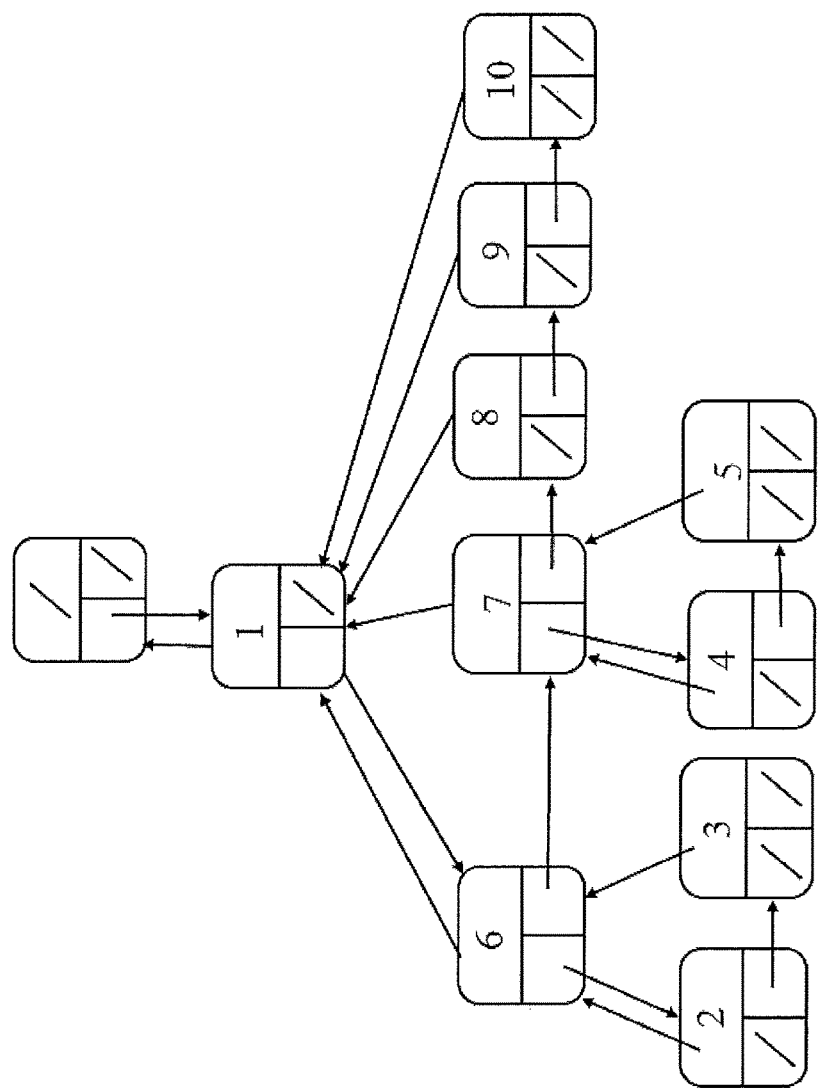
Figure 18A:
Figure 18B:
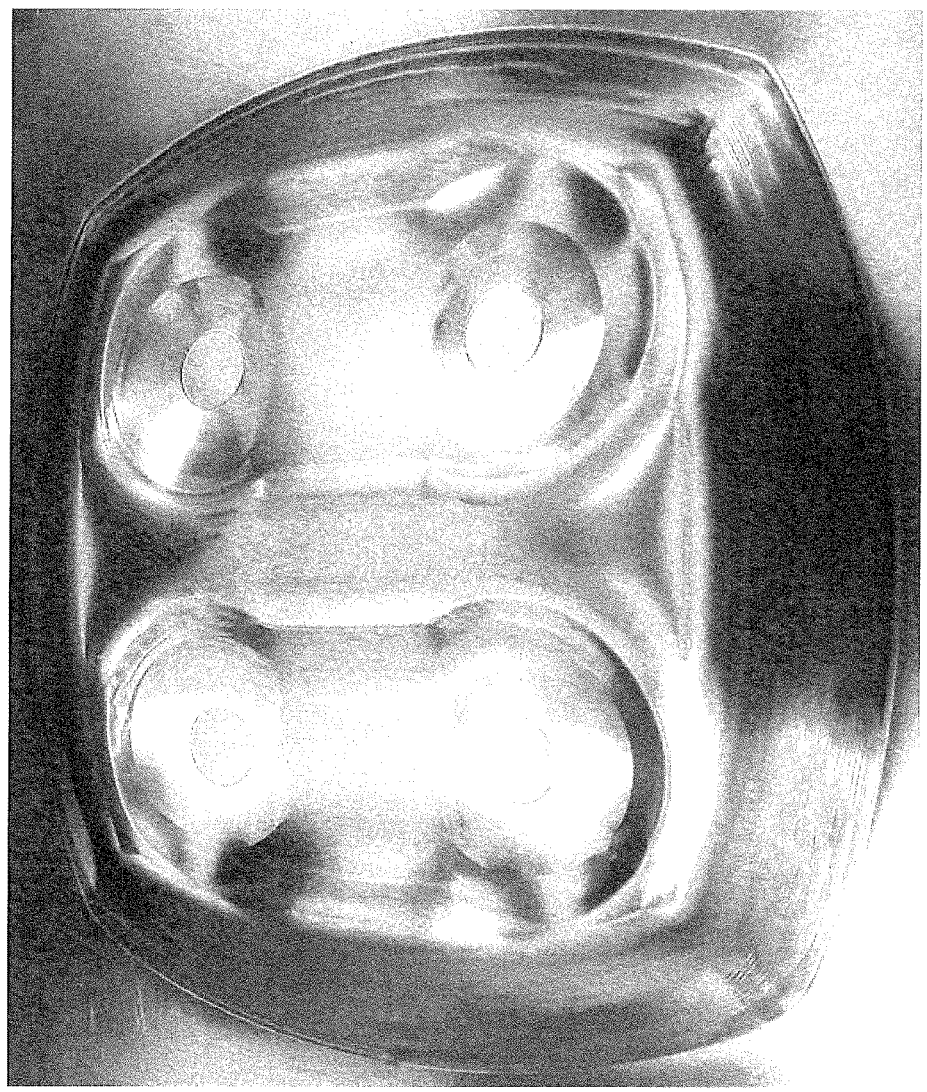
Figure 18C:
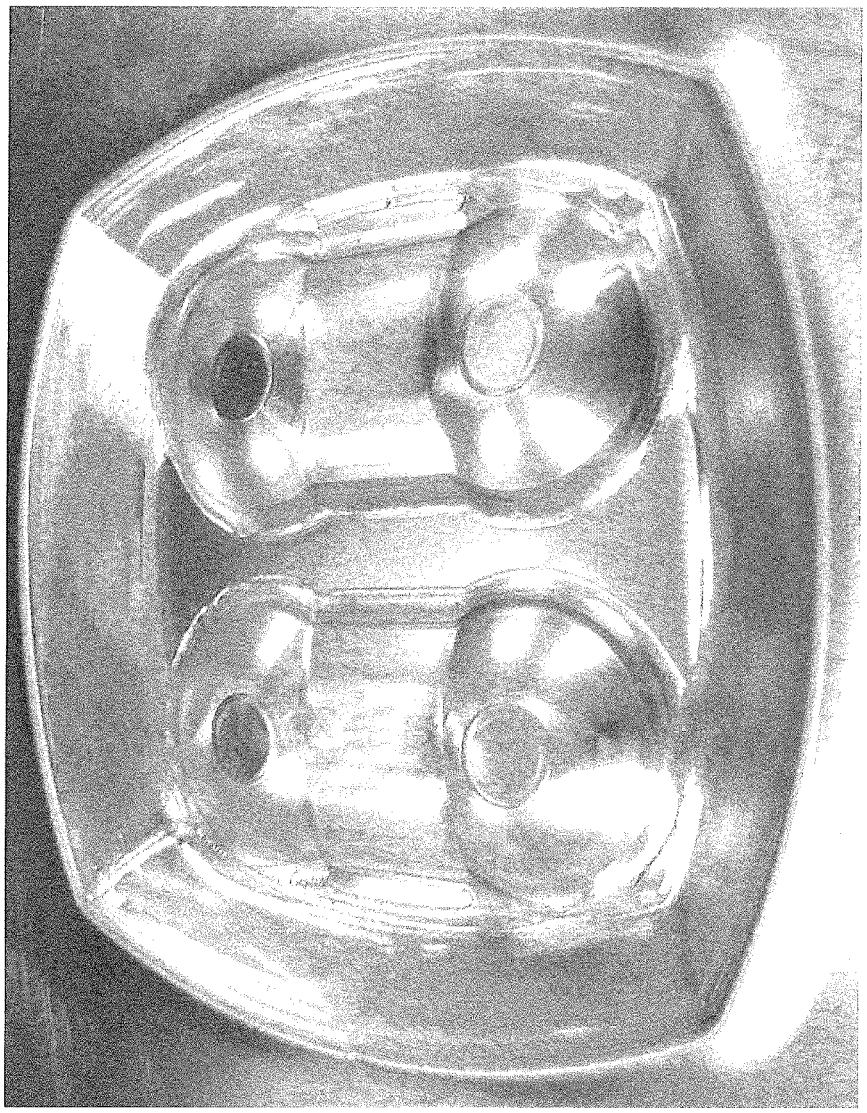
FIGS. 18c and 18d are photographs of top and bottom views respectively of an object formed in accordance with the strategy of FIG. 17c above.
Figure 18D:
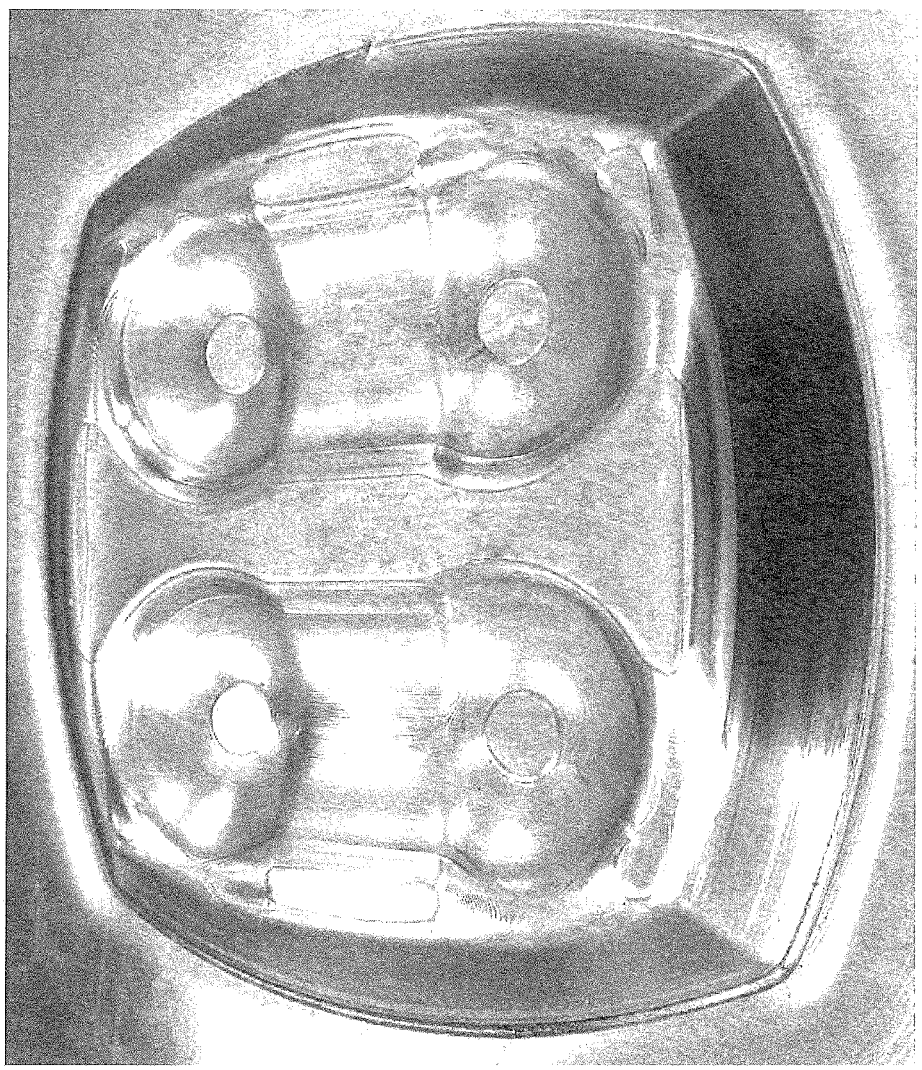

The method described above was used to generate toolpaths for the complex geometry shown in FIG. 16, where FIGS. 16a and 16b show the top and the bottom views, respectively. The features in this geometry can be numbered in the order in which they are encountered during slicing as shown in FIG. 16c, and the feature tree constructed for this geometry is shown in FIG. 17a. Features 1, 8, 9, and 10 are concave, and features 2, 3, 4, 5, 6, and 7 are convex.

Figure 12:
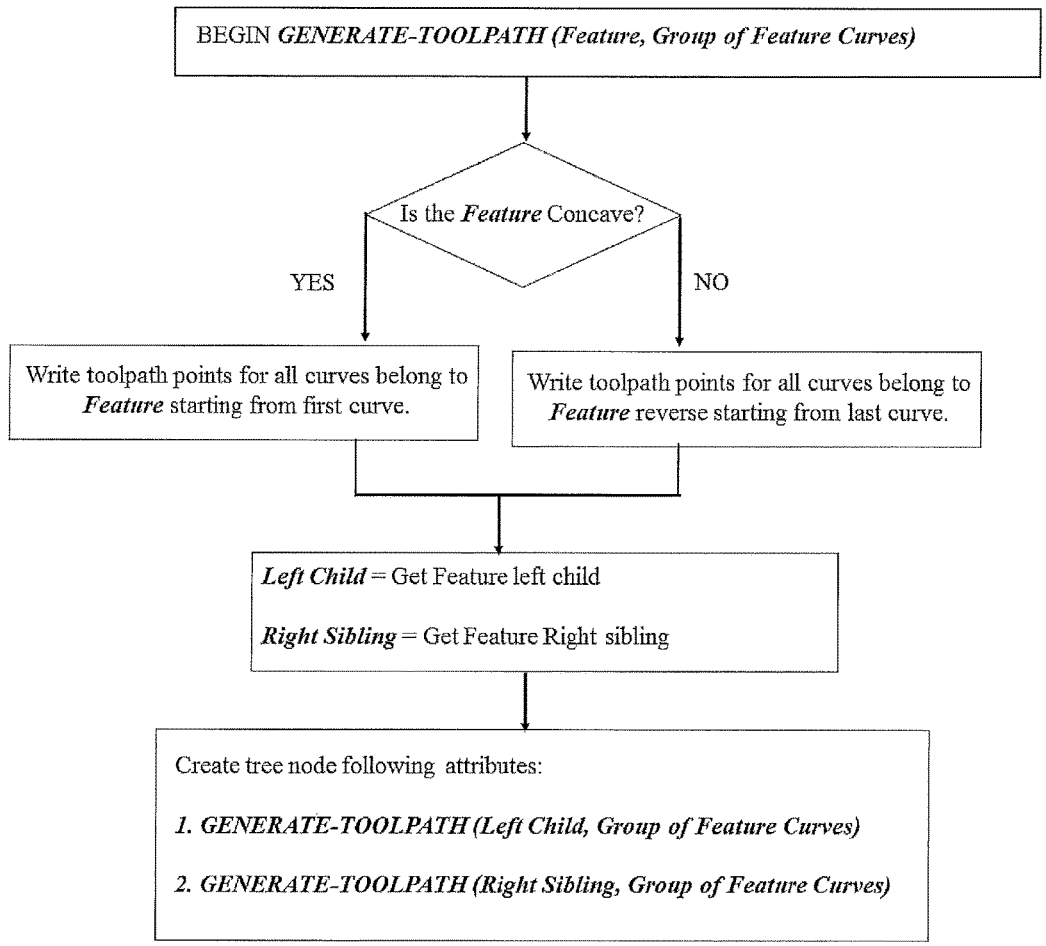
FIG. 12 illustrates an algorithm for generation of the toolpath starting from parent features and ending with the child features.

Using the algorithms outlined in FIGS. 12 & 14, the correct forming order and direction of the features were determined for two forming strategies, and experiments were run to demonstrate the flexibility of the proposed method. The experiments were run with two tools of diameter of 5 mm on a 1 mm thick AA5754-O sheet using an incremental depth of 0.1 mm.

In the first experiment, the features were formed in sequential order starting from the outermost features, as shown in FIG. 17b, while in the second experiment the features were formed in the reverse order starting from the innermost features as shown in FIG. 17c.

The experimental results for both strategies are shown in FIG. 18. From the results, it can be inferred that the experiment using Strategy 1 (FIGS. 18a and 18b) has the worse geometry accuracy especially for inner dome features. A closer look at FIG. 18a shows that the top tool (which acts as the supporting tool when forming upward) made no contact with the sheet metal when the inner domes are being formed. Loss of contact is a recurring problem in DSIF, and it is primarily caused by the inaccuracy of the sine law in predicting the sheet thickness and machine specific factors such as compliance in the tools.

Loss of contact between the sheet with the forming and supporting tools can be avoided by forming features on the virgin material using Accumulative Double-Sided Incremental Forming (ADSIF), and it can achieve better geometric accuracy compared to DSIF. However, in the previous work, only geometries with a single feature were formed. In this work, as mentioned above, all the inner features were translated to the surface of the sheet and the features were formed in the reversed order starting from the innermost feature. By doing so, the constraint of ADSIF (i.e, the dependence of geometric accuracy on the incremental depth) is eliminated while maintaining its advantage (i.e., forming the virgin material to maintain contact between tools). This strategy is accomplished by traversing the rooted tree structure using the algorithm detailed in FIG. 14 to produce the sequence shown in FIG. 17c. The result of forming the features in this sequence is shown in FIGS. 11c and 11d. Compared to the previous experiment, this experiment demonstrates a much better geometric accuracy in deforming the inner domes and contacts were maintained. Furthermore, the rooted tree and map method developed in this work can be trivially extended to a mixture of both ADSIF and DSIF strategies.

The method as described above is believed to have utility in a number of applications, including the manufacture of automotive parts, such as hood, fender, etc., for concept cars, for replacement in legacy cars, for personalized car; aerospace sheet parts, such as airplane wing; medical implants for fixtures; replacements parts for legacy equipment; and decorative sheet parts for art work or for reproduction of antique parts.

This method is capable of tracking the virgin material during forming, which eliminates the possibility of the tools puncturing the sheet during forming. Traditional CNC machining based toolpaths are not capable of tracking the virgin material (since they are meant to be used for removal processes of a bulk material).

We claim:

1. A method of automatically generating a toolpath for double-sided incremental forming of a workpiece into an object having a geometry, the method comprising:
   a. recognizing features of the geometry by i) intersecting a model of the geometry to generate a series of closed intersection curves in each of a plurality of slices; ii) ordering the intersection curves for each slice from an outermost curve for each slice; and iii) mapping the intersection curves in each slice to generate a local map;
   b. combining the local map for adjacent slices to generate a projection map;
   c. combining the projection map to generate a global map representative of all the features in the geometry;
   d. generating a rooted tree from the global map; and
   e. generating a toolpath for a double-sided incremental forming tool by traversing the rooted tree in a first order.

2. A method for making an object having a geometry by double-sided incremental forming comprising:
   a. automatically generating a toolpath by:
      a. recognizing features of the geometry by i) intersecting a model of the geometry to generate a series of closed intersection curves in each of a plurality of slices; ii) ordering the intersection curves for each slice from an outermost curve for each slice; and iii) mapping the intersection curves in each slice to generate a local map;
      b. combining the local map for adjacent slices to generate a projection map;
      c. combining the projection map to generate a global map representative of all the features in the geometry;
      d. generating a rooted tree from the global map; and
      e. generating a toolpath for a double-sided incremental forming tool by traversing the rooted tree in a first order;
   b. engaging opposite sides of a workpiece with first and second tools; and
   c. automatically moving the tools along the toolpath.

3. A system for double-sided incremental forming comprising:
   a. a frame configured to hold a workpiece;
   b. first and second tool positioning assemblies coupled with the frame, the first and second tool positioning assemblies configured to be opposed to each other on opposite sides of the workpiece, the first tool positioning assembly including a first tool holder configured to secure a first tool and the second tool positioning assembly including a second tool holder configured to secure a second tool;
   c. each of the first and second tool positioning assemblies comprising a tool holder frame movably coupled to a support structure of the tool positioning assembly; and
   d. a controller for moving the tool positioning assemblies along a toolpath wherein the toolpath is automatically generated by:
      a. recognizing features of the geometry by i) intersecting a model of the geometry to generate a series of closed intersection curves in each of a plurality of slices; ii) ordering the intersection curves for each slice from an outermost curve for each slice; and iii) mapping the intersection curves in each slice to generate a local map;
b. combining the local map for adjacent slices to generate a projection map;
c. combining the projection map to generate a global map representative of all the features in the geometry;
d. generating a rooted tree from the global map; and
e. generating a toolpath for the system by traversing the rooted tree in a first order.

4. The method of claim 1 wherein the geometry includes closed intersection curves not enclosing any other intersection curves, and the toolpath is generated by traversing the rooted tree to first form the closed intersection curves not enclosing any other intersection curves.

5. The method of claim 1 wherein the geometry includes an outermost closed intersection curve and the toolpath is generated by traversing the rooted tree to first form the outermost closed intersection curve.

6. The method of claim 1 wherein the geometry includes an innermost closed intersection curve and the toolpath is generated by traversing the rooted tree to first form the innermost closed intersection curve.

7. The method of claim 2 wherein the geometry includes closed intersection curves not enclosing any other intersection curves, and the toolpath is generated by traversing the rooted tree to first form the closed intersection curves not enclosing any other intersection curves.

8. The method of claim 2 wherein the geometry includes an outermost closed intersection curve and the toolpath is generated by traversing the rooted tree to first form the outermost closed intersection curve.

9. The method of claim 2 wherein the geometry includes an innermost closed intersection curve and the toolpath is generated by traversing the rooted tree to first form the innermost closed intersection curve.

10. The system of claim 3 wherein the controller is further configured such that if the geometry includes closed intersection curves not enclosing any other intersection curves, the toolpath is generated by traversing the rooted tree to first form the closed intersection curves not enclosing any other intersection curves.

11. The system of claim 3 wherein the controller is further configured such that if the geometry includes an outermost closed intersection curve, the toolpath is generated by traversing the rooted tree to first form the outermost closed intersection curve.

12. The system of claim 3 wherein the controller is further configured such that if the geometry includes an innermost closed intersection curve, the toolpath is generated by traversing the rooted tree to first form the innermost closed intersection curve.

* * * * *